(12) United States Patent
Steadman et al.

(10) Patent No.: US 11,504,744 B2
(45) Date of Patent: Nov. 22, 2022

(54) MODULAR, PRE-TENSIONED, SELF-CLEANING SCREENING PANELS

(71) Applicant: Buffalo Wire Works Company, Inc., Buffalo, NY (US)

(72) Inventors: Erich Steadman, Williamsville, NY (US); Bryan N. Seymour, Buffalo, NY (US)

(73) Assignee: Buffalo Wire Works Company, Inc., Buffalo, NY (US)

( * ) Notice: Subject to any disclaimer, the term of this patent is extended or adjusted under 35 U.S.C. 154(b) by 0 days.

(21) Appl. No.: 17/194,816

(22) Filed: Mar. 8, 2021

(65) Prior Publication Data
US 2021/0276045 A1    Sep. 9, 2021

Related U.S. Application Data

(60) Provisional application No. 62/986,304, filed on Mar. 6, 2020.

(51) Int. Cl.
*B07B 1/46* (2006.01)
*B01D 33/03* (2006.01)
*B07B 1/48* (2006.01)

(52) U.S. Cl.
CPC ........ *B07B 1/4618* (2013.01); *B01D 33/0376* (2013.01); *B07B 1/4654* (2013.01); *B07B 1/48* (2013.01)

(58) Field of Classification Search
CPC ....... B07B 1/4618; B07B 1/4654; B07B 1/48; B01D 33/0376

USPC .......................................... 209/397
See application file for complete search history.

(56) References Cited

U.S. PATENT DOCUMENTS

| | | | | |
|---|---|---|---|---|
| 2,052,467 | A * | 8/1936 | Hermann | B07B 1/4672 209/401 |
| 4,582,597 | A | 4/1986 | Huber | |
| 4,968,366 | A | 11/1990 | Hukki et al. | |
| 5,221,008 | A | 6/1993 | Derrick, Jr. et al. | |
| 6,053,329 | A | 4/2000 | Ballman | |
| 6,513,665 | B1 * | 2/2003 | Hukki | B07B 1/46 209/412 |
| 8,025,153 | B2 * | 9/2011 | Freissle | B07B 1/469 209/403 |
| 2003/0010437 | A1 * | 1/2003 | Adams | B01D 29/72 156/291 |
| 2009/0230029 | A1 * | 9/2009 | Bailey | B07B 1/46 209/408 |
| 2013/0319955 | A1 * | 12/2013 | Bailey | B01D 33/0376 210/780 |
| 2021/0276045 | A1 * | 9/2021 | Steadman | B07B 1/4654 |

FOREIGN PATENT DOCUMENTS

CA    2184951 A1 *  9/1996  ............... B07B 1/46

* cited by examiner

*Primary Examiner* — Terrell H Matthews
(74) *Attorney, Agent, or Firm* — Lee & Hayes, P.C.

(57) ABSTRACT

A modular, pre-tensioned, self-cleaning screening panel having a frame and at least one pre-tensioned wire that is fastened to the frame.

20 Claims, 9 Drawing Sheets

MODULAR, PRE-TENSIONED, SELF-CLEANING SCREENING PANELS

FIELD OF THE INVENTION

This application is directed toward a screening panel used, for example, with a screening machine of the type used to separate or classify mixtures of solid particles of different particle sizes into classes of different sizes. In most instances, the screening panel is removably attached to a vibratory screening machine.

BACKGROUND OF THE INVENTION

The screening machine can be used, for example, in the aggregate industry or in mining industries. The aggregate and mining industries utilize many types of machines to sort aggregates by size. Most such machines include a screening surface that includes a plurality of holes or openings. The machines utilize vibratory motions, defined below, to agitate a mixture of aggregates placed on the screening surface, to promote separation through the openings. Sorting is achieved by undersized particles passing through the openings in the screening surface and the oversize particles being retained above the screen surface. These machines usually have some type of vibrating mechanism to shake the unit and its screening surfaces. The vibrating mechanisms usually include an unbalanced weight mounted on one or several rotating shafts which, when rotated, force a cycling motion into the screen machine. The resulting motion can have a circular path, linear path, elliptical path, or any combination of those shapes. Another type of conventional machine is a trommel or rotatory screening machine that separates materials using rotation. In these machines, round screens are disposed in a rotating drum, with the material to be sorted by the screens moving via the rotation of the drum.

Machines of the type just described can be configured to accept different types of screen media. One conventional type of screen is a hooked screen panel that includes a plurality of wires generally parallel to each other. Opposite ends of the wires are provided with hooks or angled features. The hooks are coupled to a movable feature on a machine of the type described, and this movable feature is moved to tension the wires at installation/replacement of the screen. The tensioned wires then provide the screening surface. Of course, tensioning the screen panel of the type just described is a time-consuming and laborious process, usually requiring multiple installers.

Other types of vibratory machines of the type described above are configured to receive modular screens as screening media. As used herein, "modular screens" generally refers to screens having a specific size, shape, mounting features and/or configuration. Unlike the panel screens described above, modular screens may have a fixed sized and/or shape, such that the screen material that sorts the aggregate is not and/or cannot be adjusted. Modular screens may have a fixed outer frame that is received in a receptacle of the vibratory machine. Some example modular screens may be over-molded with a polymer such as urethane or rubber to facilitate coupling of the screen to the machine and/or to promote movement of aggregate across the screening surface. The polymer material is used to attach the screen panel to the screen machine, and often to also create the openings in the screen area. Modular screens typically require only a single installer with minimal training and time, and thus offer improvements over the screen panels discussed above.

Some conventional modular screen panels use aligned, un-tensioned wires to form the screening surface. In these examples, the wires are formed in a generally parallel arrangement, generally as in the screen panels discussed above. However, because the modular frame has a fixed size, the wires in these conventional screens cannot be tensioned later. They are not tensioned at all. Because of this lack of tension, previous arrangements have been fabricated only using relatively larger diameter or gauge wire, because of the higher rigidity of these wires. Alternatively, or additionally, such screens have required additional supports to provide the rigidity lacking from the untensioned wires. However, these intermediate supports reduce throughput of the modular screen.

Other conventional screen panels can include woven wire mesh as the screening surface, instead of the generally parallel wires. Wire mesh, however, has well known drawbacks. For example, pieces of the aggregate being sorted by the mesh can become lodged in openings in the mesh. These lodged pieces reduce throughput of the machine, and clearing such plugged pieces typically requires extra tools, for example a ball tray, and/or extra labor.

Thus, each of the conventional screen types described above has drawbacks. For example, the hook screen panel requires additional labor and expertise to install the screen on a vibratory machine. Modular screens with wire screening arrangements use untensioned wires, which limits the functionality and/or types of screens that can be fabricated. Mesh screens are prone to clogging.

This disclosure provides improvements in screening media used with vibratory machines.

SUMMARY OF THE INVENTION

Screening panels are disclosed, along with machinery to manufacture the screening panels and methods to manufacture the screening panel.

In one example, a screening panel includes a frame and a plurality of wires. The frame includes a first frame end spaced from a second frame end in a longitudinal direction and a first frame side spaced from a second frame side in a lateral direction. The wires extend from the first frame end to the second frame end. Individual of the plurality of wires are coupled proximate a first wire end to the first frame end and are coupled proximate a second wired end to the second frame end. The plurality of wires are in tension between the first wire end and the second wire end and are configured to vibrate independently of each other.

An example method of manufacturing a screening panel includes providing a plurality of wires, the plurality of wires extending generally from first wire ends to second wire ends in a longitudinal direction. Adjacent wires of the plurality of wires are arranged to provide a spacing therebetween. The method also includes providing a frame comprising a first frame end spaced from a second frame end in the longitudinal direction and a first frame side spaced from a second frame side in a lateral direction. The method also includes at least one of tensioning the wires in the longitudinal direction or compressing the frame in the longitudinal direction, and with the at least one of the plurality of wires tensioned in the longitudinal direction or the frame compressed in the longitudinal direction, securing the first wire ends of the plurality of wires to the first frame end and securing the second wire ends of the plurality of wires to the second frame end. The method also includes releasing the at least one of the tensioning or the compressing with the wires secured to the frame to provide a screening panel with tensioned wires in which the wires are configured to vibrate independently of each other.

DETAILED DESCRIPTION OF THE INVENTION

Figure 2:
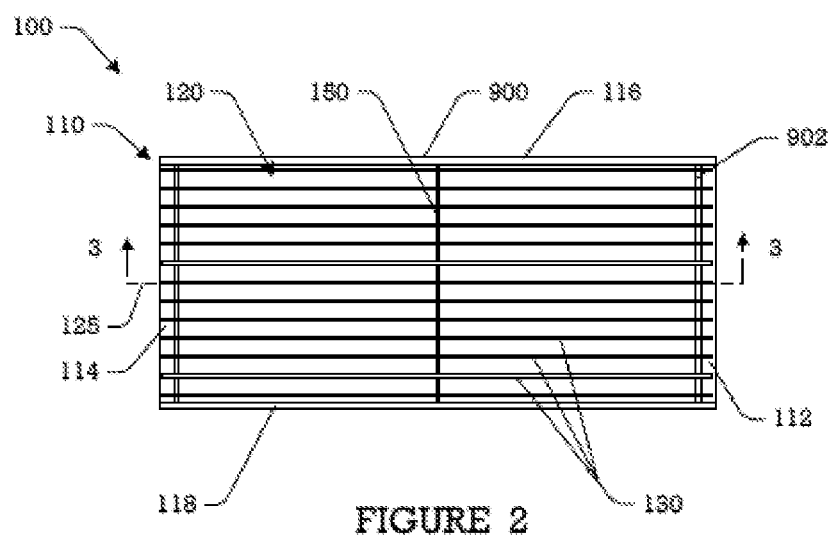
FIG. 2 illustrates a frame.

As illustrated at FIG. 2, this application relates to a screening panel 100 including a frame 110 and a plurality of wires 130 secured to the frame (see, FIG. 4) wherein the plurality of wires 130 contains at least one pre-tensioned wire.

The frame 110 has a first attachment frame end 112, a second attachment frame end 114 spaced in a longitudinal direction from the first attachment frame end 112. The frame 110 also has a first frame side 116 and a second frame side 118 spaced from the first frame side 116 in a lateral direction. The first attachment frame end 112, the second attachment frame end 114, the first frame side 116, and the second frame side 118 are connected to define the frame's outer perimeter 900 and the frame's inner perimeter 902. The frame's inner perimeter 902 defines a screen spacing area 120. In examples, the wires 130 are positioned within the screen spacing area 120.

As also shown in FIG. 2, the wires 130 are secured at a first wire end to the first attachment frame end 112 and at a second wire end to the second attachment frame end 114. The wires are illustrated as a plurality of parallel wires extending in the longitudinal direction. The wires are spaced from each other, e.g., from an adjacent wire, in the lateral direction by a predefined distance and/or in a predetermined way. Together, the wires 130 define a plurality of openings sized and/or shaped to selectively permit material of a certain size (or smaller) to pass therethrough.

In examples, the wires 130 may be arranged in a number of configurations in which the opposite ends of the wires are fixed to the attachment frame ends 112, 114. Examples of numerous wire configurations that can be used for the wires 130 are shown in FIGS. 1A-1F. These configurations include and are not limited to (1) a harp screen configuration, (2) a herringbone configuration (L-configuration), (3) a square configuration (M-configuration), (4) a double-square configuration (M-2 configuration), (5) a triangle configuration (H configuration), and (6) a clean slot configuration.

Figure 1A:
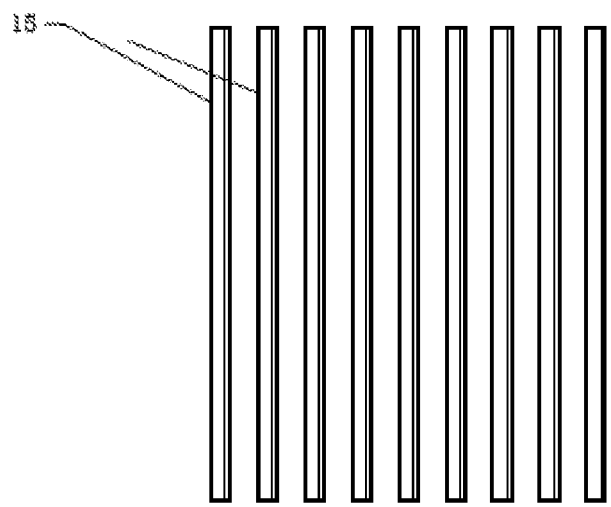
FIGS. 1A-1F illustrate various prior art wire configurations used in screening panels.

The harp screen configuration, as illustrated at FIG. 1A, illustrates straight wires wherein each wire 15 is essentially parallel with each adjacent wire. The wires 130 in FIG. 2 are generally configured in the harp screen configuration.

Figure 1B:
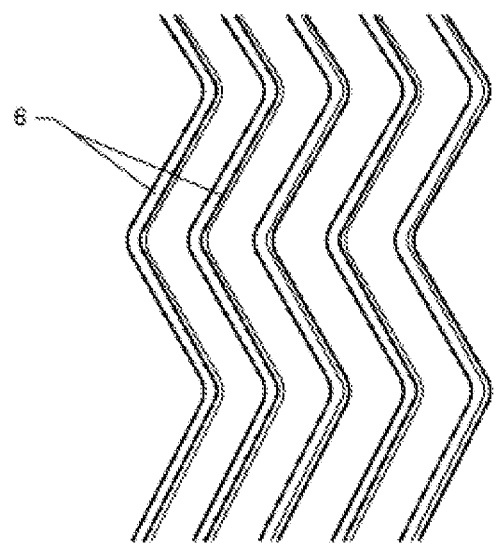

The herringbone configuration, as illustrated at FIG. 1B, has a plurality of wires wherein each wire 6 (a) has the same zig-zag pattern and (b) is essentially parallel with each adjacent wire.

Figure 1C:
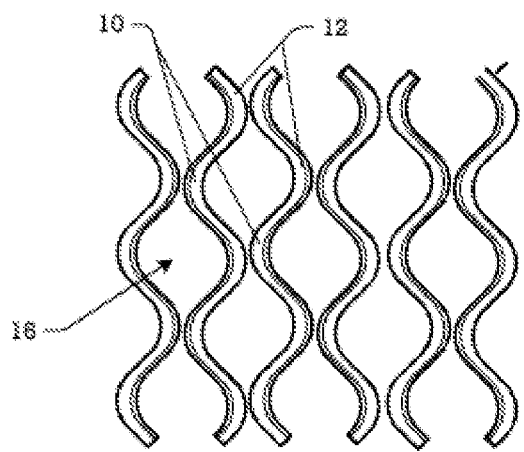

The square configuration, as illustrated at FIG. 1C, has a plurality of wires wherein (a) each wire has a zig-zag pattern having a plurality of apex locations 10 and a plurality of nadir locations 12, and (b) each wire's apex location 10 is positioned to contact or nearly contact a second, adjacent wire's nadir location 12 and each first wire's nadir location 12 is positioned to contact or nearly contact an adjacent wire's apex location 10 to create a square or rectangular spacing 16 between the adjacent wires.

Figure 1D:
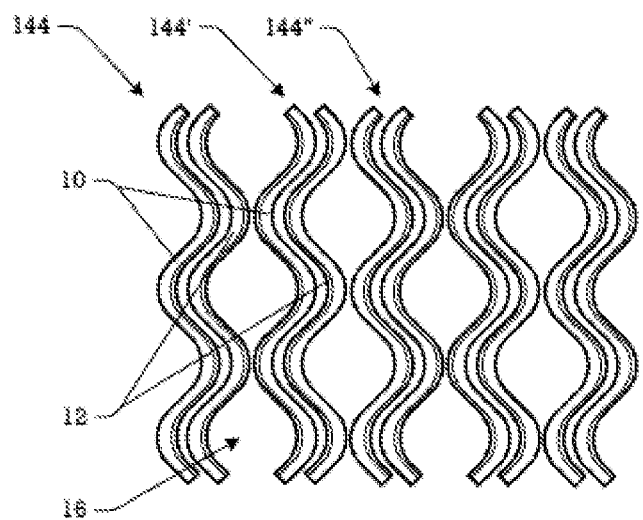

The double square configuration, as illustrated at FIG. 1D, is a variation of the square configuration. Each wire set 144, 144', 144" is two parallel or essentially parallel wires wherein each wire in the wire set has a zig-zag pattern having a plurality of apex locations 10 and a plurality of nadir locations 12. A second wire set's 144' apex location 10 is positioned to contact or nearly contact the third wire set's 144" nadir location 12 and the second wire set's 144' nadir location 12 is positioned to contact or nearly contact the first wire set's 144 apex location 10 to create a square or rectangular spacing 16 between the adjacent wire sets.

Figure 1E:
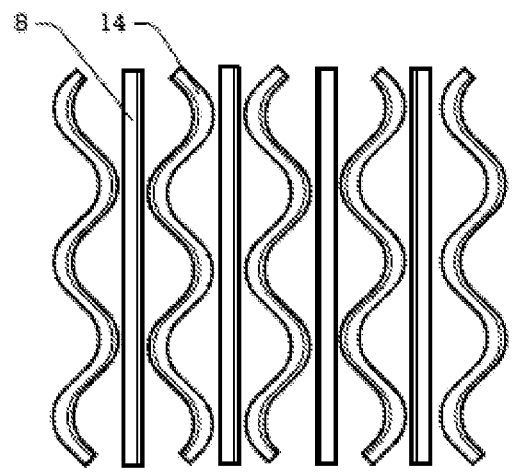

The triangle configuration, as illustrated at FIG. 1E, is a variation of the square configuration, with a straight wire 8 positioned between zig-zag wires 14.

Figure 1F:
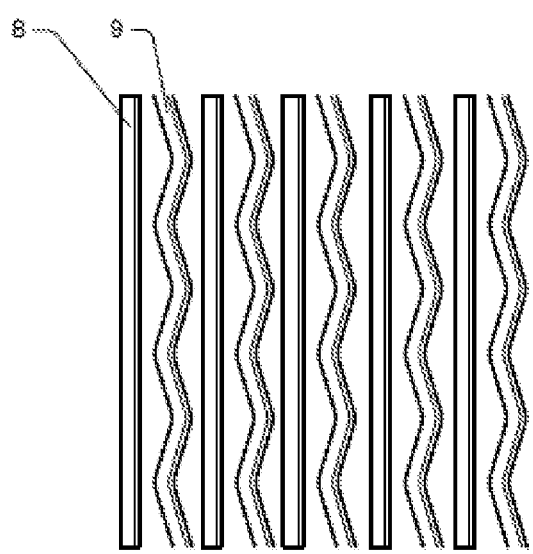

The clean slot configuration, as illustrated at FIG. 1F, is an alternative version of the harp configuration in that every straight wire 8 is adjacent to a crimped wire 9.

In examples of this disclosure, the wires 130 are arranged in the screen spacing area 120, e.g., in a configuration such as one of the configurations of FIGS. 1A-1F. As noted above, the wires 130 are attached at opposite ends to the attachment frame ends 112, 114 in the desired configuration. Each of the wires 130 is spaced laterally from adjacent wires. Unlike in a mesh, the wires 130 are not supported by interwoven, laterally disposed wires.

The wires 130 may be arranged to have self-cleaning properties. For example, a self-cleaning screen has openings that can vary slightly in size or shape. For instance, in examples described herein, the wires 130, or at least portions of the wires, are allowed to vibrate independently, e.g., relative to each other, to slightly vary the size of the openings defined by adjacent wires. For instance, the wires 130 of the present disclosure are fixed at their ends and are not otherwise constrained along their length. In other instances, motion of the wires 130 may be minimally constrained between their ends, e.g., at a point of contacting the support member 150, at a point of contact with one or more other support members, one or more laterally-extending wires, or the like. Stated differently, the wires 130 or portions of the wires are allowed to vibrate to slightly vary openings between the wires 130. By slightly increasing the size of an opening, a lodged or wedged material may become dislodged. In contrast, conventional non-self-cleaning screens have openings that are generally fixed, e.g., by the nature of a weave, welding, molding or perforations in a sheet or plate.

The screening panel 100 can also have an interconnecting structure 352, made of conventional screening panel materials such as and not limited to metallic material like steel, or a polymeric material like urethane or rubber, or combinations thereof positioned over the frame 110 so the interconnecting structure 352 is formed so the screening panel 100 can be, preferably easily, removably attached to a specific screening machine (not shown). The interconnecting structure 352 can be any shape that fits a specific screening machine. More specifically, the screening panel 100 has a generally fixed size and shape defined by the frame 110 and/or the interconnecting structure 352. The size and shape are generally fixed or predefined to facilitate attachment of the panel to a receptacle or cooperating features of a vibratory machine. The term "modular" may be used herein to generally refer to such panels having a fixed size, shape and/or arrangement of attachment features.

Collectively, the frame's interior perimeter—delineated by the first attachment frame end 112, the second attachment frame end 114, the first frame side 116, and the second frame side 118—defines the screen spacing area 120. Likewise, the panel's interior perimeter—delineated by the interconnecting structure 352 (a) over the frame 110; (b) under the frame 110; (c) on the frame's outer perimeter 900, (d) on the frame's interior perimeter 902, or (e) combinations thereof—defines the panel spacing 320. The screen spacing area 120 and the panel spacing 320 can be the same size or different size especially if the interconnecting structure is positioned on the interior perimeter 902.

Un-tensioned and tensioned are terms dependent on how a wire reacts when cut in (a) the screen spacing if the frame 110 is exposed or (b) the panel spacing 320 if the interconnecting structure 352 is formed.

Figure 7A:
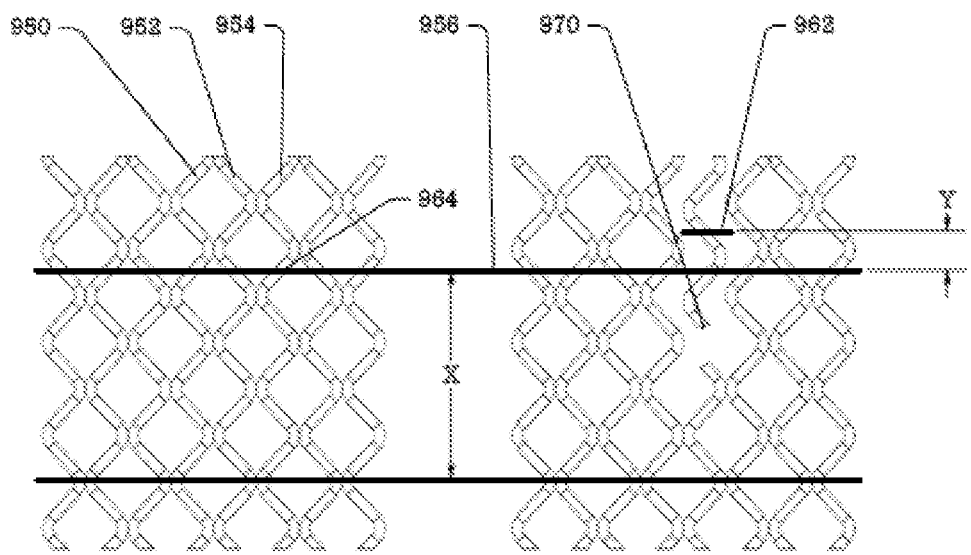
FIGS. 7A and 7B illustrate examples of cut wires from un-tensioned wires (FIG. 7A) and tensioned wires (FIG. 7B).

FIG. 7A illustrates tensioned wires 950, 952, and 954, as in examples of our invention, interconnected to a frame (not shown) prior to cutting the wire (left side) and after cutting the wire (right side). The tensioned wires 950, 952, and 954 were scored (or marked) in the same horizontal plane 956. In the illustrated example, the horizontal plane 956 provides a reference line extending laterally across the array of wires. After marking the tensioned wires, Applicant cut wire 952 at 970. As illustrated, a reference line 962 on cut tensioned wire 952 noticeably moved away (as shown in FIG. 7A the distance Y) from the horizontal plane 956 while the uncut tensioned wires 950, 954 remain in their original positions. With a tensioned wire, the measured distance Y between two marks on the wire decreases if the tension in the wire is removed by cutting at a spot not between the two marks. It is understood to those skilled in the art that a suitably accurate measurement between two marks on a wire can be accomplished by various methods such as CMM or optical device with the two marks spaced significantly apart and the central axis of the wire aligned with a straight line. Further, it is understood that the decrease is relative to the wire's cross-sectional area. That means that a tensioned wire having a cross sectional area of, for example, 1 mm$^2$ will be significantly decreased compared to a wire having a cross-section area of, for example, 10 mm$^2$.

Figure 7B:
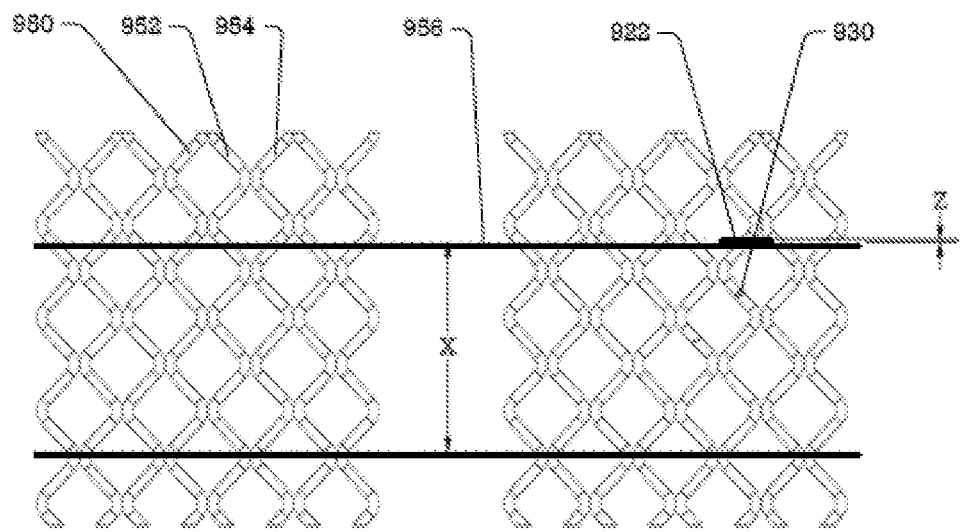

In contrast, FIG. 7B illustrates un-tensioned wires, including wires 910, 912, and 914, as in some conventional arrangements, interconnected to a frame (not shown) prior to the cutting the wire (left side) and after cutting the wire (right side). The un-tensioned wires 910, 912, and 914 were scored (or marked) in the same horizontal plane 956). After scoring the un-tensioned wires, Applicant cut wire 912 at 930. As illustrated, the score line 922 on cut un-tensioned wire 912 (also illustrated at line 926) and the score lines 920, 924 on uncut un-tensioned wires 910, 914 remained essentially in the same horizontal plane 936 and location as identified by the distance Z. With an un-tensioned wire, a measured distance between two marks on the wire does not materially change if the wire is cut at a spot not between the two score marks.

Stated differently, when a tensioned wire of the wires 130 is cut or breaks, the tension in the wire causes the segments on either side of the cut to appreciably shorten or recoil. In contrast, untensioned wires, as in conventional arrangements, do not appreciably move.

Figure 3:
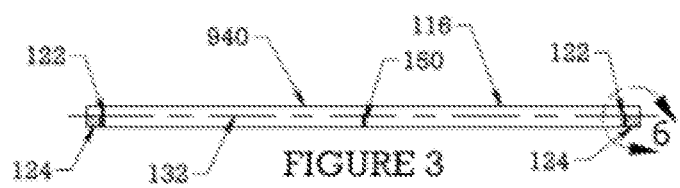
FIG. 3 illustrates a cross-section of FIG. 2 taken along the lines 3-3.
Figure 6:
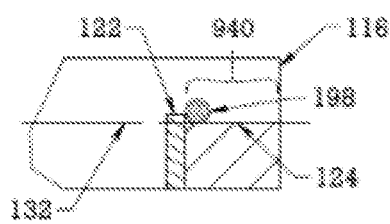
FIG. 6 illustrates an enlarged view of FIG. 3 taken along the line 6-6.

The first attachment frame end 112 and the second attachment frame end 114 can each have an upper bond area 122 and a lower bonding surface 124, as illustrated at FIG. 3 and the magnified view of FIG. 6. (Note that in FIG. 3, the wires 130 are omitted for clarity.) The upper bond area 122 is positioned adjacent to the frame's interior perimeter 902 while the lower bonding surface 124 is positioned adjacent to the frame's exterior surface 900. The upper bond area 122 and the lower bonding surface 124 can be (a) two different pieces or (b) machined from a single piece. As illustrated at FIG. 6, the frame 100 has a base level 800, a first level 802 that is equal to the height of the lower bonding surface in relation to the base level, a second level 804 that is equal to the height of the upper bond area in relation to the base level, and a third level 806 that is equal to the height of the first frame side (and the second frame side) in relation to the base level. It is understood that the third level is above the second level, the second level is above the first level and the first level is above the base level.

Although the frame 110 is illustrated as having a rectangular shape, the frame 110 is not limited to this shape. For example, the frame 110 may be square, ovular, circular, have rounded features, or the like. Any shape that allows for tensioning of the wires 130 as in examples described herein is contemplated.

The lower bonding surface 124 is configured to receive an adhesive 198 that secures the wires 130 to the frame 110 while the first frame side 116, and second frame side 118 are designed to have no adhesive thereon since the first frame side 116, and second frame side 118 do not normally secure any wire to the frame 110 or panel 100. Examples of the adhesive can be UV cured methyl methacrylate or acrylic ester, such as and not limited to Loctite's HH8003 or AA312 industrial adhesive material manufactured by the Henkel Corporation of Düsseldorf, Germany. Obviously, the adhesive could be altered to other adhesives like epoxy materials. It is also understood that alternative methods such as welding, sonic welding, screws, magnets, bending, nuts and bolts and combinations thereof can also be used to secure the tensioned wires to the frame. When the alternative method to secure the tensioned wires to the frame is used, it is preferable to weld the tensioned wires to the frame on the upper bond area 122, the lower bonding surface 124 and combinations thereof. In some examples, the upper bond area 122 is not necessary.

In any case, when an adhesive material is used, the upper bond area 122 inhibits the adhesive material from leaking into the screen spacing 120 and ensures the wires 130 remain in or near (in many instances, slightly above as a result of size constraints) a neutral axis of bending 132 (defined below) with the frame 110. The upper bond area 122 also provides the adhesive support against shear forces on the first attachment frame end's 112 and the second attachment frame end's 114 top surface 940 (illustrated at FIG. 6) and requires the adhesive 198 fails in tension upward before shear becomes an issue.

As previously expressed, the frame 110 has the first attachment frame end 112, the second attachment frame end 114, the first frame side 116, and the second frame side 118.

Likewise, it is possible that the frame 110 can have one or more additional support members to enhance the rigidity of the frame 110 and/or to further support the wires 130. For example, and as illustrated at FIGS. 2 and 3, the frame 110 can include a support bar 150 extending laterally, e.g., generally parallel to the first attachment frame end 114 and the second attachment frame end 114. Although a single support bar 150 is illustrated, more than one support bar 150 may be provided. Moreover, in some instances the support bar 150 may not be required. Reducing the number of support bars 150 may be beneficial, e.g., because each support bar reduces the effective screening area of the screening panel. The support bar 150 may provide support to (a) the frame 110 when the frame 110 is compressed (illustrated by arrow 200) during the manufacturing process of the screening panel 100 or (b) the screening panel when the screening panel 100 experiences vibration forces by the screening machine. In particular, each support bar 150 extends from the first frame side 116 to the second frame side 118 to inhibit the frame 110 or screening panel 100 from bending (illustrated by arrow 202) or bowing too much when the frame 110 is being compressed during the manufacturing of the screening panel 100 or the screening panel is vibrated by a screening machine.

The support bar 150 is one example of a support member that enhances the rigidity of the frame 110. In other examples, the frame 110 can include other support members, including but not limited to one or more longitudinally extending support members, e.g., positioned between and parallel to the first frame side 116 and the second frame side 118. Other support members can include angled or oblique support members. As noted above, the frame 110 may include no additional support member.

When a support member, like the support bar 150, is provided in the screening area, the wires 130 may contact the support member. In some examples, the wires 130 may be fixed or attached to the support member, using welding, adhesive, or the like. Even when attached to the support member, the wires 130 are able to vibrate to provide the self-cleaning properties discussed above. For instance, a sufficient amount of the wires 130 extends between the support bar 150 and the frame ends 112, 114 that is capable of independent vibration.

The first frame side 116 and the second frame side 118 each have a neutral axis. The neutral axes of each the first and second frame sides are normally positioned at the halfway point of the height of the respective first and second frame side. The present invention directs the forces in the wires in the plane between the neutral axis of the first frame side 116 and the neutral axis of the second frame side 118 to decrease and inhibit bending the frame 100. The plane positioned between the neutral axis of the first frame side 116 and the neutral axis of the second frame side 118 are referred to as the neutral axis of bending 132. It is preferred, the wires 130 are designed to be positioned therein or near the neutral axis of bending 132. The neutral axis of bending 132 is designed to be the location in which all forces applied to the screening panel 100 (and frame 110) are supposed to be concentrated in order to minimize the bending of the screening panel 100 (and frame 110).

Tensioned wires are positioned in or near the neutral axis of bending 132 to decrease and/or inhibit the wires from bending up (arrow 202) or down—depending on the tension—in the frame 110. Likewise, the tensioned wires are in the neutral axis of bending 132 to inhibit the frame from bending up (arrow 202) or down—depending on the tension.

As previously addressed, this invention is directed to modular screens with tensioned wires. As detailed further herein, screens of this disclosure can be manufactured by tensioning wires and/or compressing a frame prior to fastening the wires to the frame. Applicants have confirmed through experimentation that if tensioned wires that are evenly tensioned or about evenly tensioned are applied to a non-compressed frame, then the resulting screening panel has wires positioned near the first and second frame sides retaining the desired tension while the remaining middle section wires lose tension as a result of the frame deflecting as a result of the tensioned wires. The lost tension of the middle section wires is significant because the middle section then does not function as an effective self-cleaning screen.

Another advantage of the present invention is that tensioned wires applied to a compressed frame permits the screen spacing 120 to be maximized by minimizing the number of support bar(s) 150 and/or other support members, which may include supports that extend between the first frame end and the second frame, for instance, parallel to the first and second frame sides, except positioned in the screen spacing area 120. Additional support members have been utilized in prior art screen frames of the same size. That being said, the support bar 150 and/or additional support member may be used in some screen frame embodiments of the present invention.

To further assist in minimizing the bending of the screening panel 100, the support bar 150 (and/or other support members) may be positioned proximate the neutral axis 132. With this arrangement, the support bar 150 assists in directing any forces applied to the screening panel 100 into the neutral axis 132. For instance, the support bar 150 may resist lateral displacement of the sides 116, 118 away from each other when the frame 110 is under compression. In other examples, the support bar 150 may be slightly above or below the neutral axis 132, such that the wires 130 can be disposed in the neutral axis 132. In examples, the number of support bars 150 and/or other support members may be minimized, to reduce an impact on throughput of the screening panel 100, as noted above. Fewer support bars results in the screening panel 100 being a better self-cleaning device with greater throughput since the present invention's use of pre-tensioned wires minimizes the spacing between the wires from expanding such that the screens have an increased efficiency of self-cleaning properties.

When the tensioned wires 130 (the tension force is illustrated by arrows 204 and range from 2,000 to 5,000 lbs.) are positioned in or as close to the neutral axis 132 as possible, then the tensioned wire 130 can be attached to the frame 110 when the frame 110 is being or already compressed (the compression force is illustrated by arrows 200 and range from 1,000 lbs. to 3,000 lbs.) during the manufacturing process. The screening panel 100 experiences (a) compression forces on the frame 110 and (b) the tension forces when the tensioned wires are securely attached to the frame 110 at or near the same time, then the screening panel 100 should experience lower bending forces (arrows 202). That in turn, should render the screening panel 100 a more stable product that retains the desired wire tension that results in superior self-cleaning characteristics and greater throughput capabilities.

As can be readily appreciated, the wires 130 are tensioned in one direction (see arrows 204) when positioned and attached to the frame—between the first attachment frame end 112 and the second attachment frame end 114—and in the neutral axis 132. It is also understood that the wires 130 can have different tensions. For example, the wires 130 positioned or to be positioned at or near the center of (A) the screen spacing area 120 and (B) the first attachment frame end 112, the second attachment frame end 114 can be at a higher tension (1 to 50% greater, 5 to 25% greater and/or 10 to 20% greater) than the wires 130 positioned or to be positioned at or near the first frame side 116 and the second frame side 118 and/or any support member parallel to the frame sides. That various tensioned wire embodiment, combined with the optional compressed frame 110, provides for more consistent tensioning of all wires in the screening area. For example, along the attachment frame ends 112, 114, the frame is more rigid proximate the sides 116, 118, than at positions nearer the centers of frame ends 112, 114 (spaced from the sides 116, 118). Because of this varied rigidity, the frame may provide different resistances to the tensioned wires, and in this example the wires are tensioned based on these different resistances, with the result being more evenly tensioned wires. Differently tensioning the wires may result in a more efficient self-cleaning screen apparatus.

It is also understood that some of the wires 130 positioned adjacent to or very near the first frame side 116 and/or the second frame side 118 could be un-tensioned while the remaining wires 130 positioned along and near the screen spacing area's 120 center line 125 that extends from the first attachment frame end 112 to the second attachment frame end are tensioned. The more efficient self-cleaning screen apparatus is maintained with the present invention on the condition that the un-tensioned wires 130 positioned adjacent to or very near the first frame side 116 and/or the second frame side 118 have a tension strength after the frame is decompressed that is the same or equivalent (within 1 to 25%) of the tension of the tensioned wires 130 positioned along and near the screen spacing area's 120 center line 125, when the frame is decompressed.

That one directional wire tensioning also permits the wires 130 while in the screening panel 100 to provide (i) a more efficient self-cleaning screen apparatus and (ii) greater precision in the throughput when the screening panel 100 is installed in the screening machine. Moreover, when the screening panel 100 is installed in the screening machine, the screening panel 100 with the tensioned wires 130 is not subject to further tensioning of the frame 110 and/or wires 130 since the screening panel 100 with the tensioned wires 130 is properly sized to easily be installed into the screening machine without applying further tension to the screening panel 100 when being installed. It is understood that the screening panel 100 may be further tensioned in some screening machines during installation or operation, however that is unlikely since the present invention's modular, self-cleaning screens is designed to be placed in a receptable for vibratory screening machine. But for the most part, the screening panel 100 need not be further tensioned with most vibratory screening machines.

In contrast, when un-tensioned screening panels are installed into screening machines, the un-tensioned screening panels must be adjusted, in many instances by numerous employees, into the screening machine to properly be installed therein and obtain the desired tension in the wires and frame. Such endeavors are undesirable, and objectives can be difficult or unpredictable to achieve.

Making one version of the tensioned screening panel is accomplished by a multi-step process using a dual carriage device 300. The dual carriage device 300 has a frame compressing unit 310 and a screen tensioning unit 330, as illustrated at FIG. 5.

The frame compressing unit 310 has a first securing unit 312 that releasably secures the first attachment frame end 112 in the proper position during the assembly process of the screening panel 100; and a second securing unit 314 that releasably secures the second attachment frame end 114 in the proper position during the assembly process of the screening panel 100. The first securing unit 312 and the second securing unit 314 can releasably secure the respective first and second attachment frame ends 112, 114 through clamps, screws, nuts and bolts, or combinations thereof; or alternatively the first securing unit 312 and the second securing unit 314 merely contact and push the respective first and second attachment frame ends 112, 114 toward each other.

Figure 5:
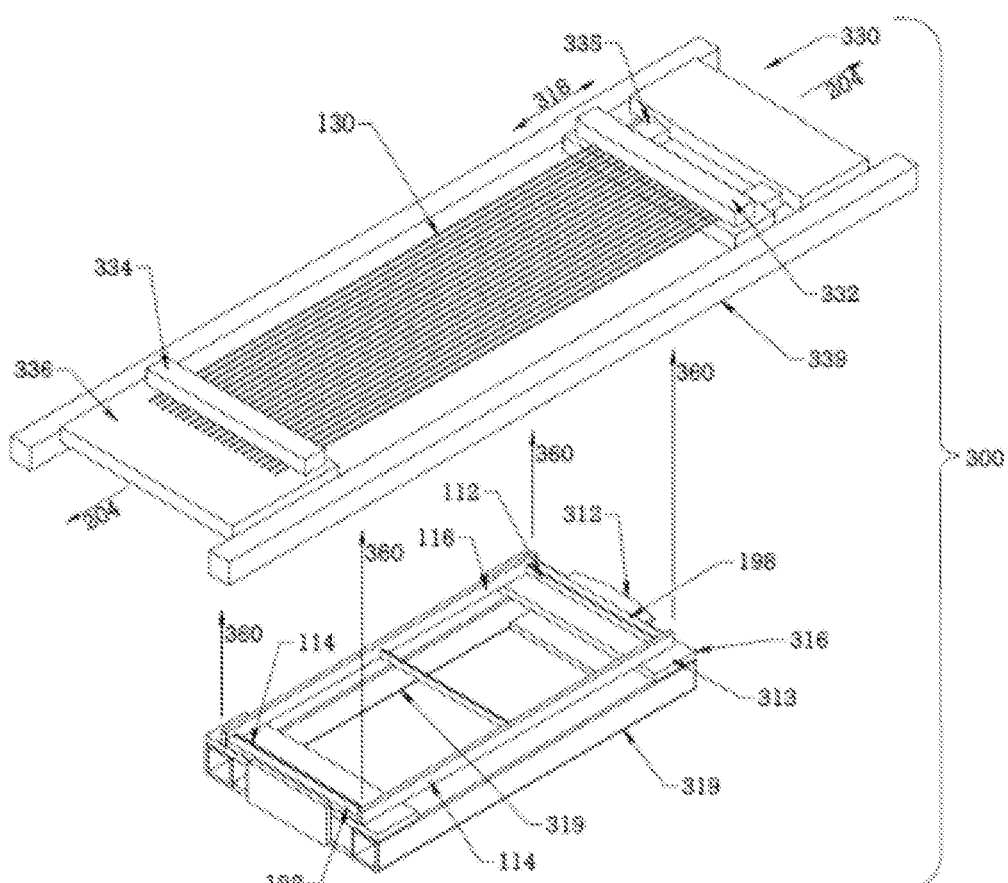
FIG. 5 illustrates a dual carriage device having a frame carriage compressing unit and a screen tensioning unit.

In one embodiment illustrated at FIG. 5, the second securing unit 314 is stationary while the first securing unit 312 is on a carriage 313. The carriage 313 moves on rails 319 in directions—identified by arrows 318—parallel to the first frame side and the second frame side when the frame 110 is releasably secured (or contacted and pushed) in the first and second securing units 312, 314. The first securing unit 312 on the carriage 313 and interconnected to a hydraulic system (or servo-motors, linear actuators or other types of actuators) 316 moves toward the lower securing unit 314 and can compress (arrows 200) the frame 110 a predetermined distance. The hydraulic system 316 can be hydraulic fluid contained in conventional pistons in order to control the movement of the upper securing unit 312; or alternatively, the hydraulic system 316 could be replaced with any other system that accomplishes the same objectives as the hydraulic system 316. For example, the relative movement could be accomplished using a manually-operated system, a system driven by servo motors, linear actuators, pneumatics, or the like. The upper securing unit 312 in conjunction with the hydraulic system 316—after an operator (a) positions the frame 110 within the upper securing unit 312 and the lower securing unit 314 and (b) initiates the hydraulic system 316—compresses the first attachment frame end 112 toward the second attachment frame end 114 a predetermined distance. The predetermined distance can range from 0.01 mm to 2 mm. In the alternative way, at least one block contacts the attachment frame end 112 and at least one pusher contacts the second attachment frame end 114 (or vice versa or there are at least one pusher on each frame end 112, 114). The at least one pusher moves and causes each frame end 112, 114 to bow under the compressive force resulting from the movement. At which point, the pre-tensioned wires are attached to the bowed frame and the bowing resists the tension. The displacement of the frame ends 112, 114 will vary across the width as a result of the bowing, with the understanding that in the middle of the frame ends 112, 114 the distance will be greater and at the sides of the frame ends 112, 114 the distance will be less.

Alternatively, the lower securing unit 314 can be on the carriage 313 and interconnected to the hydraulic system 316, and the upper securing unit 312 is stationary. The hydraulic system 316 can be hydraulic fluid contained in conventional pistons in order to control the movement of the lower securing unit 314; or alternatively, the hydraulic system could be replaced with any other system that accomplishes the same objectives as the hydraulic system 316. For example, the relative movement could be accomplished using a manually-operated system, a system driven by servo motors, linear actuators, pneumatics, or the like. The lower securing unit 314 in conjunction with the hydraulic system 316—after an operator (a) positions the frame 110 within the upper securing unit 312 and the lower securing unit 314 and (b) initiates the hydraulic system 316—compresses the second attachment frame end 114 toward the first attachment frame end 112 a predetermined distance.

Alternatively, the lower securing unit 314 and the upper securing unit 312 are respectively on their own carriages 313 and interconnected to the hydraulic system 316. The hydraulic system 316 can be hydraulic fluid contained in conventional pistons in order to control the movement of the upper and lower securing units 312, 314; or alternatively, the hydraulic system 316 could be replaced with any other system that accomplishes the same objectives as the hydraulic system 316. For example, the relative movement could be accomplished using a manually-operated system, a system driven by servo motors, linear actuators, pneumatics, or the like. The upper and lower securing units 312, 314 in conjunction with the hydraulic system 316—after an operator (a) positions the frame 110 within the upper securing unit 312 and the lower securing unit 314 and (b) initiates the hydraulic system 316—compresses the second attachment frame end 114 and the first attachment frame end 112 toward each other a predetermined distance.

Figure 8B:
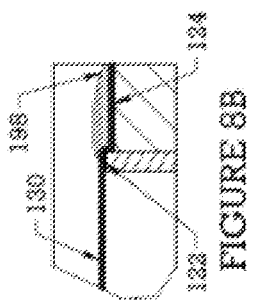
FIG. 8A illustrates how the adhesive encapsulates a wire in one embodiment and FIG. 8B illustrates how the adhesive encapsulates a wire in another embodiment.
Figure 8A:
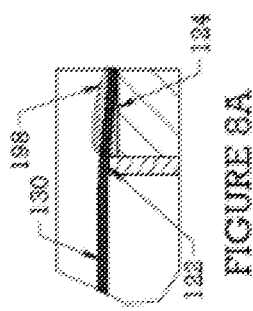

Either prior to or after the frame 110 is compressed, the operator applies the adhesive 198 on the lower bonding surface 124. The adhesive 198 is sufficiently applied so that when the wire 130 is properly positioned on the frame 110, the portion of the wire 130 that is supposed to contact the adhesive 198 is also encapsulated by the adhesive 198 as illustrated at FIGS. 8A and 8B. By encapsulated, the wire's top surface, bottom surface and both side surfaces are in the adhesive 198. That way, there is no bond area starvation below, above or on the sides of the portion of the wire 130 that is supposed to contact the adhesive 198. The wire 130 can (a) have a slight bend as it is positioned over the upper bond area 122, and the lower bonding surface 124 as illustrated at FIG. 8A or (b) conform to the shape of the upper bond area 122 and the lower bonding surface 124 as illustrated at FIG. 8B.

Either prior to or after the frame 110 is compressed, the wires 130—having any of the above-identified configurations or combinations thereof—are releasably secured to the screen tensioning unit 330. Like the frame carriage compressing unit 310, the screen tensioning unit 330 has a first tensioning unit 332 that releasably secures a first location of the wires 130 in a proper position during the assembly process of the screening panel 100; and a second tensioning unit 334 that releasably secures a second location of the wires (usually the first location is one end of the wire to be tensioned and the second location is the opposite end of the wire to be tensioned) in the proper position during the assembly process of the screening panel 100.

In one embodiment, the upper tensioning unit 332 is stationary while the lower tensioning unit 334 is on a carriage system 335. The carriage 335 moves on rails 339 in directions—identified by arrows 338—parallel to (a) the first frame side and the second frame side when the frame 110 is releasably secured in the first and second securing units 312, 314, and (b) the wires 130 when the wires 130 are releasably secured in the first and second tensioning units 332, 334. The second tensioning unit 334 on the carriage 335 and interconnected to a second hydraulic system 336 moves away from the first tensioning unit 334 and to provide tension (arrows 204) to the wires 130 by moving a predetermined distance.

The second hydraulic system 336 (i) operates in the same way as hydraulic system 316 and (ii) could be the same system as the hydraulic system 316. After (a) the wires are properly positioned in the first and second tensioning units 332, 334; (b) the wires need to be tensioned, and (c) the operator initiates the second hydraulic system 336—the second tensioning unit 334 moves away from the first tensioning unit 332 a predetermined distance to obtain the desired tension for the screening panel 100.

Alternatively, the second tensioning unit 334 is stationary while the first tensioning unit 332 is on a carriage system—interconnected to a second hydraulic system 336—that moves—after (a) the wires are properly positioned in the first and second tensioning units 332, 334; (b) the wires need to be tensioned, and (c) the operator initiates the second hydraulic system 336—the first tensioning unit 332 away from the second tensioning unit 334 a predetermined distance to obtain the desired tension for the screening panel 100.

Alternatively, the first tensioning unit 332 is on an first carriage system and the second tensioning unit 334 is on a second carriage system, wherein the first carriage system and the second carriage system are interconnected to the second hydraulic system 336 that moves—after (a) the wires are properly positioned in the first and second tensioning units 332, 334; (b) the wires need to be tensioned, and (c) the operator initiates the second hydraulic system 336—the second tensioning unit 334 and the first tensioning unit 332 away from each other a predetermined distance to obtain the desired tension for the screening panel 100.

Once (a) the wires 130 are tensioned, (b) the frame 110 is compressed, and (c) the adhesive 198 is applied to the frame 110, the frame carriage compressing unit 310 is moved (see, arrows 360) toward the screen tensioning unit 330 so the frame 110 and the adhesive 198 contacts the wires 130 located between the second tensioning unit 334 and the first tensioning unit 332. The wires are then securely attached after the adhesive is cured to the frame 110 and the wires. That movement 360 can be accomplished by conventional hydraulic motions using, for example, the hydraulic system 316.

Alternatively, when the frame 110 is compressed and the tensioned wires 130 contact the second attachment frame end 114 and the first attachment frame end 112, an operator can weld the tensioned wires 130 that contact the frame 110 to the second attachment frame end 114 and the first attachment frame end 112.

Once the tensioned wires 130 are fastened or secured to the optionally compressed frame 110, the screen tensioning unit 330 is adjusted so if there are portions of the wires not positioned in the screen spacing 120 and attached to the frame 110 become un-tensioned. The un-tensioned wires can then be safely cut or removed so the compressed frame 110 and tension wires 130 can be removed from the dual carriage device 300.

In the example just described, the wires are put in tension and the frame is compressed prior to wires being fixed to the frame. Forces in the compressed frame counter forces in the tensioned wires to maintain the wires in tension when the connected wires and frame are removed from the dual carriage device. Although the example just discussed achieves this tension through both the tensioning of the wires with the screen tensioning unit and the compression of the frame using the frame compressing unit, other example methods may include only tensioning wires with the screen tensioning unit. In some examples, the frame may have sufficient rigidity to resist the tension of the wires without the need to first compress the frame. In another example, untensioned wires may be secured to a frame maintained in compression, for example, by the frame compression unit.

When the compression is released, the frame may apply a force to wires sufficient to place the wires in tension.

Other variations to the described method also may be used. For example, although the screen tensioning unit is illustrated as clamping all wires and tensioning them uniformly, in other examples the screen tensioning unit can tension wires independently or in groups, similar to the example discussed above. For example, wires closer to the frame sides may require less tension (because the sides provide additional frame rigidity) whereas wires closer to the center of the attachment frame ends may be subjected to a higher tension (because they are farther from the sides and therefore the frame has less rigidity). In addition to the benefits discussed above, this selective tensioning may be particularly useful in methods that do not include pre-compression of frame, because the frame will resist the tensioning differently at different area. Other methods and/or modifications also are contemplated.

Regardless of the method used, we have demonstrated a modular screening panel having a fixed size and/or shape with tensioned wires. The use of wires allows for the screen to be self-cleaning, thereby providing improvements over mesh screens. Moreover, by tensioning the wires at manufacture or fabrication, screens disclosed herein provide improvements over panel screens that require tensioning at installation. Furthermore, tensioning the wires at manufacture provides an improved screen over modular screens that do not have tensioned wires. Without limit, because previous modular screens did not have tensioned wires, they were usually fabricated from wires having some minimal rigidity (generally thicker wires) to prevent sagging or excessive movement during vibration. Alternatively, previous modular screens without tensioned wires needed several supports for the wires, to prevent this sagging and excessive movement, which reduced overall throughput of the screen.

It may be possible to add one or more additional wires to the wires 130 in the screen spacing area 120. For instance, these additional wires may not be parallel with the tensioned wires 130. The wires may be used for support, e.g. as with the support member 150, or for other purposes. The disclosure is not limited to only wires, like the wires 130, extending generally in a single direction. However, examples of this disclosure may differentiate over mesh patterns that require interwoven wires in different directions that may prohibit the self-cleaning of the screen, as described herein.

Figure 9:
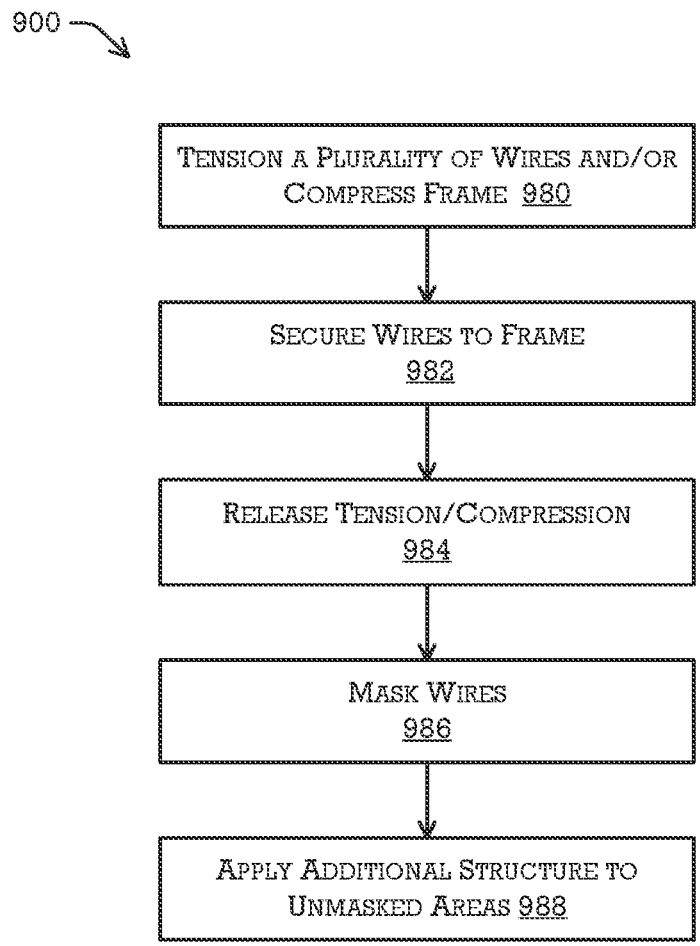
FIG. 9 illustrates a flow chart of manufacturing a screening panel.

FIG. 9 is an examples flow chart showing an example process 900 for manufacturing a screen panel, such as the panel 100.

At an operation 980, the process 900 includes tensioning a plurality of wires and/or compressing a frame. These operations are detailed above. For example, tensioning the plurality of wires may include gripping, clamping or otherwise securing the wires proximate a first end by a first unit and proximate an opposite, second end by a second unit, and moving the units relative to each other, e.g., away from each other, to place the wires in tension. Compressing the frame may include placing the ends of a frame between movable units and moving the units relative to each other, e.g., closer to each other, to compress the frame. For instance, the compression may cause portions of the ends of the frame to bow or displace so as to be relatively closer to each other.

At an operation 982, the process 900 includes securing the wires to the frame. As discussed above, with the wires in tension and/or the frame in compression, the wires are welded, adhered or otherwise secured to the frame ends.

At an operation 984, the process 900 includes releasing the tension and/or compression. In some examples, a machine, such as the dual carriage machine discussed above may be used to place the wires in tension and/or the frame in compression. Upon securing the wires to the frame, e.g., after a curing time for adhesive, cooling of welds or the like, the machine may remove the tension and/or compression. Once released, the frame and the wires reach an equilibrium in which the wires remain (or are placed) in tension and the frame remains (or is placed in) compression. The result is a screening panel 120 with tensioned wires, as in FIG. 2.

In some examples, the process 900 may include additional steps. For instance, the process 900 can include additional steps to modify the panel 120 for use in different machines.

At an operation 986, the process 900 can optionally include masking the wires. For example, a mask may be applied to the tensioned wires 130 that are to be exposed when the screening panel is in use. For instance, the portions of the tensioned wires 130 that are arranged in the panel spacing 320 may be masked.

At an operation 988, the process 900 can also optionally include applying additional structure to the unmasked areas of the screen 320. For instance, the additional structure may comprise the interconnecting exterior structure 352. In some examples, the additional structure can be a polymeric structure, such as urethane, rubber, or the like. The additional structure may be designed so the screening panel 100 can be removably and securely positioned in a desired vibratory machine.

Figure 4:
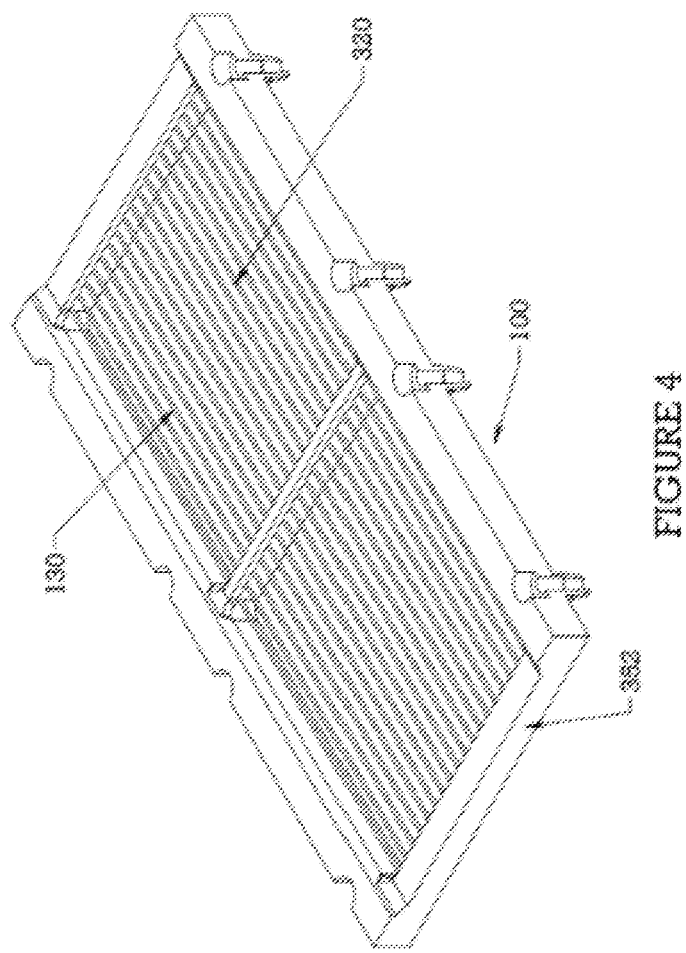
FIG. 4 illustrates a frame with tensioned wires converted into a screening panel.

The operation 988 may include applying the additional structure using a molding process, such as molding or injection molding. In some examples, a die or mold includes a cavity sized to receive portions of the screening panel 120 with tensioned wires. For instance, the die or mold can include a cavity that receives the frame 110 and provides additional spacing around the frame 110. Mold material, e.g., liquid polymer, is introduced into the cavity. Upon curing, the mold material encapsulates the frame 110, e.g., on all sides, as well as the attachment of the wires 130 to the frame 110. When the die is removed, the result may be the modular screen 100 with interconnecting structure 352, shown in FIG. 4. As also illustrated in FIG. 4, the mold material can also encapsulate the support bar 150 and portions of the wires 130 proximate the support bar 150. While not shown specifically in FIG. 4, the mold material may further contact (and/or encapsulate) additional portions of the wires 130. Without limitation, portions of the wires 130 closest to the sides 112, 114 may be at least partially encapsulated by the mold material.

In at least some examples, the mold or die used to create the panel 100 of FIG. 4 may be sized to receive the entire frame 110. For example, the frame 110 with tensioned wires 130 may be placed in a die that includes cavities to create all of the exterior interconnecting structure 352, e.g., in a single mold step. In some examples, the mold or die may include a masking region that receives portions of the wires 130 that are not to be overmolded. Without limitation, the masking region can include a soft polymer that is configured to receive and contact portions of the wires 130 in one or more of the configurations discussed above. Applying the exterior structure 352 in a single step mold processing obviates the need for one or more additional fabrication steps. For instance, some conventional modular screens mold their frames prior to attachment of their untensioned wires. In some instances, ends of these untensioned wires may also be molded. The wires are then fastened to the screens.

Although the operation 988 is described in connection with applying a polymeric or molded material as the additional structure, other additional structures are contemplated. The additional structures may vary based on the vibratory machine with which the modular screen 100 is to be used. For instance, the additional structure can include mounting structures such as flanges, tabs, detents, fasteners, or the like. In other examples, this additional structure may be initially included in the frame 110. The additional structure can also include gaskets, spacers, seals and/or the like. As noted, the additional materials may be added to facilitate use of our screen with tensioned wires with different types of vibratory machines. As will be appreciated, with the operation 986 does not require applying a mold as the additional structure, the process 900 may omit masking the wires at the operation 986.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

The invention claimed is:

1. A screening panel comprising:
a frame comprising a first frame end spaced from a second frame end in a longitudinal direction and a first frame side spaced from a second frame side in a lateral direction; and
a plurality of wires pre-tensioned and fixed to the frame, the plurality of wires extending from the first frame end to the second frame end, individual of the plurality of wires being fixed proximate a first wire end to the first frame end and being fixed proximate a second wire end to the second frame end, the plurality of wires being pre-tensioned between the first wire end and the second wire end and being configured to vibrate independently of each other.

2. The screening panel of claim 1, wherein the wires are in tension such that, when a wire of the plurality of wires cut at a longitudinal position between the first wire end and the second wire end, at least one of a first portion of the wire between the first wire end and the cut shortens in the longitudinal direction or a second portion of the wire between the second wire end and the cut shortens in the longitudinal direction.

3. The screening panel of claim 1, wherein at least one of the first frame end or the second frame end further comprises a bonding surface and a raised bonding surface.

4. The screening panel of claim 3, wherein the plurality of wires contact the raised bonding surface and are secured to the bonding surface using an adhesive, the raised bonding surface inhibiting migration of the adhesive prior to curing.

5. The screening panel of claim 1, wherein the plurality of wires are pre-tensioned from about 2,000 lbs. to about 5000 lbs.

6. The screening panel of claim 1, further comprising a polymeric structure encapsulating at least a portion of the frame and ends of the plurality of wires, the polymeric structure having at least one of a size or a shape to facilitate coupling of the screening panel to a vibratory machine.

7. The screening panel of claim 6, wherein the polymeric structure at least partially encapsulates at least one of a first wire of the plurality of wires proximate the first frame side or a second wire of the plurality of wires proximate the second frame side.

8. The screening panel of claim 1, wherein:
the frame further comprises at least one support extending laterally between the first frame side and the second frame side, at a position spaced from the first frame end and the second frame end; and
the plurality of wires are disposed to contact the support.

9. The screening panel of claim 1, wherein:
the first frame end has a first neutral axis extending generally along a longitudinal axis of the first frame end;
the second frame end has a second neutral axis extending generally along a longitudinal axis of the second frame end; and
the plurality of wires are arranged proximate a plane coincident with the first neutral axis and the second neutral axis.

10. A method of forming a screening panel comprising:
providing a plurality of wires, the plurality of wires extending generally from first wire ends to second wire ends in a longitudinal direction and adjacent wires of the plurality of wires being arranged to provide a spacing there between;
providing a frame comprising a first frame end spaced from a second frame end in the longitudinal direction and a first frame side spaced from a second frame side in a lateral direction;
with the plurality of wires separate from the frame, at least one of tensioning the wires in the longitudinal direction or compressing the frame in the longitudinal direction;
with the at least one of the plurality of wires tensioned in the longitudinal direction or the frame compressed in the longitudinal direction, securing the first wire ends of the plurality of wires to the first frame end and securing the second wire ends of the plurality of wires to the second frame end; and
releasing the at least one of the tensioning or the compressing with the wires secured to the frame to provide a screening panel with pre-tensioned wires in which the wires are configured to vibrate independently of each other.

11. The method of claim 10, wherein the at least one of the tensioning the un-tensioned wires or the compressing the frame comprises tensioning the un-tensioned wires, the tensioning the un-tensioned wires comprising:
securing, via a first unit, the plurality of wires proximate the first wire ends;
securing, via a second unit, the plurality of wires proximate the second wire ends; and
moving the first unit relative to the second unit to place the plurality of wires in tension.

12. The method of claim 11, wherein the moving the first unit relative to the second unit imparts a force of from about 2000 pounds to about 5000 pounds of tension on the plurality of wires.

13. The method of claim 10, wherein the at least one of the tensioning the un-tensioned wires or the compressing the frame comprises tensioning the un-tensioned wires, the tensioning the un-tensioned wires comprising:
tensioning a first wire of the plurality of wires to a first tension; and
tensioning a second wire of the plurality of wires to a second tension.

14. The method of claim 10, wherein the at least one of the tensioning the un-tensioned wires or the compressing the frame comprises compressing the frame, the compressing the frame comprising:
contacting a first unit to the first frame end;
contacting a second unit to the second frame end; and
moving the first unit relative to the second unit to move at least a portion of the first frame end relatively closer to the second frame end.

15. The method of claim 10, wherein at least one of the securing the first wire ends to the first frame end or the securing the second wire ends to the second frame end comprises at least one of adhering or welding.

16. The method of claim 10, further comprising:
applying an overmold to the screening panel with tensioned wires.

17. The method of claim 16, wherein the overmold encapsulates at least a portion of the first frame end, the second frame end, the first frame side, the second frame side, the first wire ends and the second wire ends.

18. The method of claim 16, wherein the overmold further encapsulates at least a portion of the at least one of a first wire of the plurality of wires proximate the first frame side or a second wire of the plurality of wires proximate the second frame side.

19. A screening panel for use in a vibratory machine comprising:
a frame including frame ends and frame sides;
a plurality of pre-tensioned wires extending between and fixed to the frame ends, the pre-tensioned wires being arranged to define spaces through which material can pass during use of the vibratory machine, and individual of the pre-tensioned wires being fixed to the frame ends independently of other of the plurality of pre-tensioned wires; and
an interconnecting structure disposed over the frame and at least a portion of the plurality of pre-tensioned wires, the interconnecting structure providing the screening panel with a fixed size and shape for coupling to the vibratory machine.

20. The screening panel of claim 19, wherein the interconnecting structure comprises a molded polymer.

* * * * *